(12) United States Patent
Garrett (10) Patent No.: US 8,760,134 B2
(45) Date of Patent: Jun. 24, 2014

(54) SIMULATING POWER SUPPLY INDUCTOR CURRENT

(75) Inventor: James Garrett, Nashua, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 99 days.

(21) Appl. No.: 13/564,170

(22) Filed: Aug. 1, 2012

(65) Prior Publication Data

US 2014/0035546 A1 Feb. 6, 2014

(51) Int. Cl.
*G05F 1/56* (2006.01)
*G05F 1/565* (2006.01)
*G05F 1/575* (2006.01)

(52) U.S. Cl.
USPC .......................................... 323/282; 323/285

(58) Field of Classification Search
USPC .................................. 323/282–286
See application file for complete search history.

(56) References Cited

U.S. PATENT DOCUMENTS

| | | | | |
|---|---|---|---|---|
| 4,672,303 | A * | 6/1987 | Newton | 323/285 |
| 4,727,308 | A * | 2/1988 | Huljak et al. | 323/222 |
| 6,069,522 | A * | 5/2000 | Venkatraman et al. | 327/552 |
| 6,205,036 | B1 * | 3/2001 | Anzawa | 363/20 |
| 7,138,790 | B2 * | 11/2006 | Hackner et al. | 323/282 |
| 7,164,258 | B2 * | 1/2007 | Umminger | 323/282 |
| 7,646,616 | B2 * | 1/2010 | Wekhande et al. | 363/21.12 |
| 7,652,945 | B2 | 1/2010 | Chu et al. | |
| 7,791,324 | B2 | 9/2010 | Mehas et al. | |
| 7,965,064 | B2 * | 6/2011 | Morong et al. | 323/206 |
| 2006/0209577 | A1 * | 9/2006 | Hackner et al. | 363/39 |
| 2006/0250824 | A1 * | 11/2006 | Wekhande et al. | 363/20 |
| 2007/0069705 | A1 * | 3/2007 | Umminger | 323/282 |
| 2010/0090767 | A1 * | 4/2010 | Ohnishi et al. | 330/277 |
| 2011/0234171 | A1 * | 9/2011 | An et al. | 320/135 |
| 2011/0280053 | A1 * | 11/2011 | Halberstadt | 363/126 |
| 2012/0242310 | A1 * | 9/2012 | Ueno et al. | 323/282 |

* cited by examiner

*Primary Examiner* — Adolf Berhane
*Assistant Examiner* — Nusrat Quddus
(74) *Attorney, Agent, or Firm* — Grossman Tucker; Perreault & Pfleger PLLC (57) ABSTRACT

One embodiment described herein provides a circuit to approximate the inductor current of a power supply that includes a capacitor; charge/discharge circuitry configured to charge the capacitor with a voltage that is proportional to an input voltage rail of the power supply, and discharge the capacitor with a voltage that is proportional to the output voltage of the power supply; and error correction circuitry is configured to adjust the voltage that is proportional to the input voltage rail and the voltage that is proportional to the output voltage based on an instantaneous current of the inductor; and wherein the voltage on the capacitor is proportional to a current associated with the inductor.

23 Claims, 3 Drawing Sheets

SIMULATING POWER SUPPLY INDUCTOR CURRENT

FIELD

The following disclosure relates to simulating power supply inductor current.

BACKGROUND

DC/DC converters may output a voltage that is lower, higher or the same as the input voltage. Their performance depends in part on the DC resistance (DCR) of the inductor in the converter circuit. DCR is attributed to the construction of the inductor (e.g., the resistance of the wire used in the winding, the number of windings, etc.). While low DCR inductors are more efficient (e.g., dissipate less power through heat), the lower resistance may cause problems when trying to provide current feedback for controlling the DC/DC converter. In particular, the lower the DCR the more difficult it becomes to measure current through the inductor. To circumvent this problem, inductor current may be "approximated" through DC resistance current censing. DC current Sensing places a resistor-capacitor (RC) network in parallel with the inductor to simulate the inductor current. However, the RC network must be "tuned" (e.g., the component values of the RC network must be selected) based on the characteristics of the inductor. Thus, in addition to the need to reconfigure the RC network whenever the inductor is replaced, problems may also arise during operation. For example, fast-switching pulse-width modulation (PWM) frequencies may cause parasitic capacitance in the circuit and/or temperature increases in the inductor may cause inductor characteristic changes, impacting the accuracy of DC resistance current sensing.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

In general, this disclosure describes power supply systems (and methods) that include current sense simulation circuitry configured to generate a simulation of current through an inductor. The simulated current may be used as a feedback control signal to control the operation of a power supply. Contrary to existing systems, the disclosed embodiments may provide the feedback signal without relying on tuned RC components to generate the current sense signal.

Figure 1:
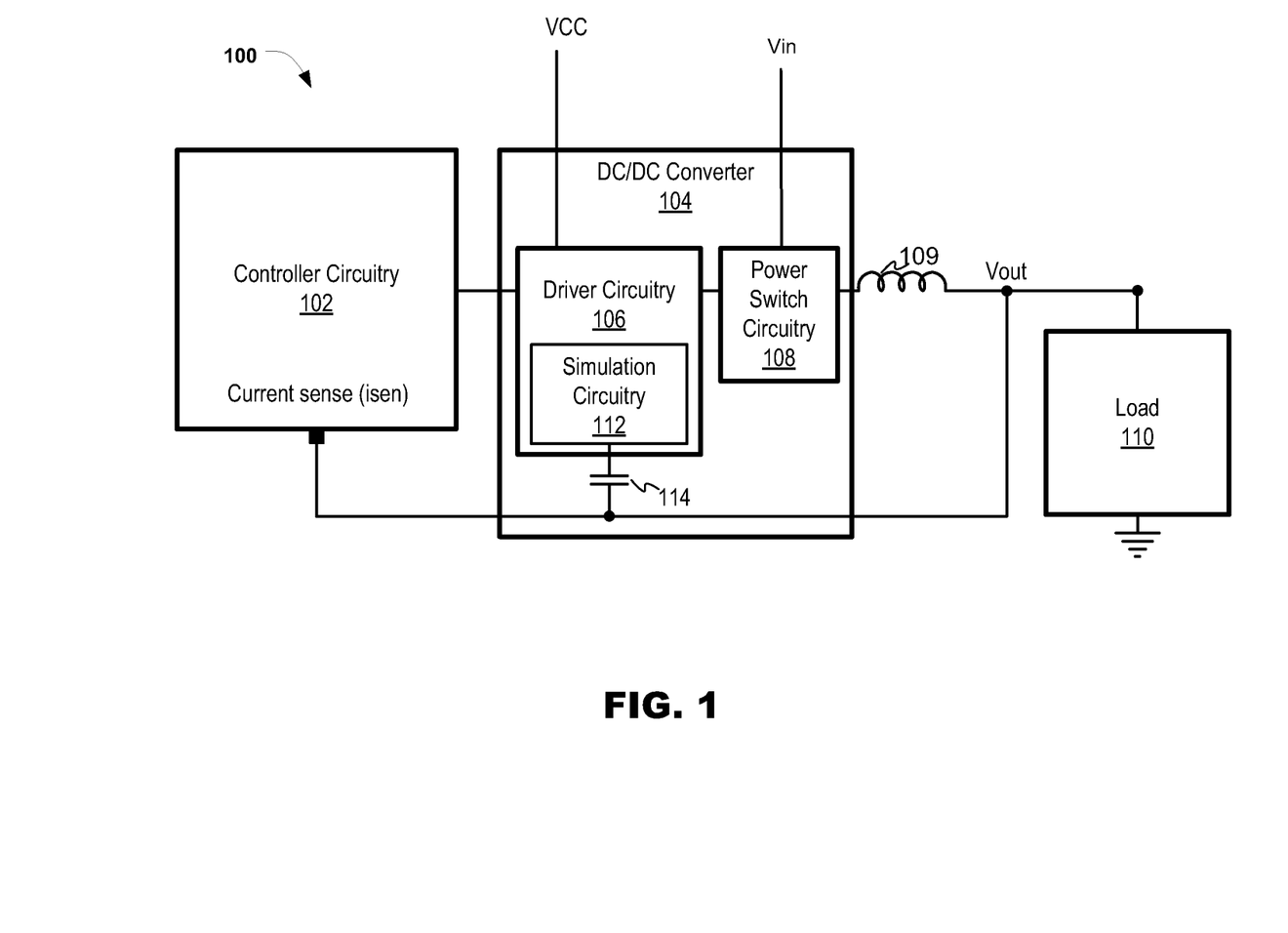
FIG. 1 illustrates a power supply system in accordance with at least one embodiment of the present disclosure.

FIG. 1 illustrates a power supply system 100 consistent with various embodiments. The system 100 includes controller circuitry 102 and DC/DC converter circuitry 104 configured to charge an inductor 109 to supply controllable power to a load 110. The DC/DC converter circuitry 104 may generally include switching regulator circuitry that includes driver circuitry 106 and switch circuitry 108. The power supply system 100 is intended to include any power supply topology that utilizes an inductor to deliver power to a load, and may include known topologies such as Buck, boost, Buck-boost, flyback, SEPIC, and/or other known or after-developed DC-DC converter topologies. In addition, while embodiments are described herein with specific reference to DC/DC converter topologies, the present disclosure may also be used for inductor-based AC/DC inverter topologies such as Full-Bridge, Half-Bride, Class D, etc. Controller circuitry 102 is generally configured to generate a pulse width modulation (PWM) signal to control the operation of the DC/DC converter circuitry 104 to cause driver circuitry 106 to drive the power switch circuitry 108 in a manner that results in inductor 109 becoming charged. Driver circuitry 106 is configured to generate a complimentary PWM signal based on the PWM signal generated by the controller circuitry 102. As is well known, the switch circuitry 108 may generally include a high side power switch and a low side power switch (not shown) that are configured to switch an input voltage rail, Vin, to charge the inductor 109. The switches of the power switch circuitry 108 are generally configured to switch in a complimentary fashion using the PWM signal, i.e., the driver circuitry 106 supplies the PWM signal to the high side power switch and the driver circuitry 106 supplies the complimentary PWM signal (PWMb) to the low side power switch. The charged inductor 109, acting as a power reservoir, may then provide an output voltage (Vout) to load 110. To ensure that Vout is provided at the desired voltage, controller 102 may receive feedback from the output of the inductor 109.

To avoid the need for complex tuning of feedback circuitry, and to allow for a wide variety of inductors to be used with the power supply system 100, the present disclosure provides inductor current simulation circuitry 112 ("simulation circuitry") that is configured to simulate the current through the inductor 109. The simulation circuitry 112 generally operates by simulating the slope of the current in the inductor 109 using a voltage across capacitor 114. In general, the simulation circuitry 112 is configured to provide current feedback information to the controller circuitry 102 to enable the controller circuitry 102 to adjust the duty cycle of the PWM signal to controllably deliver power to the load 110.

Simulation circuitry 112 makes use of the formula for voltage in an inductor, V=L dI/dt, wherein it is noted that the slope of the output current (dI/dt) is equal to the voltage across the inductor divided by the inductance (L). Thus, in a buck converter, when the PWM signal is high, the voltage across the inductor 109 may be approximated as (Vin−Vout), and when the PWM input signal is low the voltage across the inductor may be approximated as (−Vout). Since a capacitor has duality with an inductor (e.g., voltage and current may be exchanged in the same relationship), it may be noted that if a current is forced through the capacitor 114 that is proportional to (Vin−Vout) while the PWM signal is high, and a current is forced through the capacitor that is proportional to (−Vout) while PWM signal is low, a voltage signal may be recreated that has a slope directly proportional to the slope of the current signal. The change in voltage over time (dV/dt) across the capacitor 114 is equal to the change in current over time times an assumed DC winding resistance of the inductor 109 (dI/dt*Rdcr), if the capacitor 114 is selected appropriately. However, in practice it may not be precise enough to directly equate the slopes of the inductor current with the capacitor voltage. A capacitor is basically an integrator, and any difference in error between the slopes of the voltages may cause the capacitor 114 to head to either rail (e.g., Vcc, Vdd) during operation causing clipping to occur. Thus, the simulation circuitry 112 may also employ DC error correction to provide a DC offset to the capacitor voltage to correct for slope errors. The simulation circuitry 112 is described in greater detail below.

Figure 2:
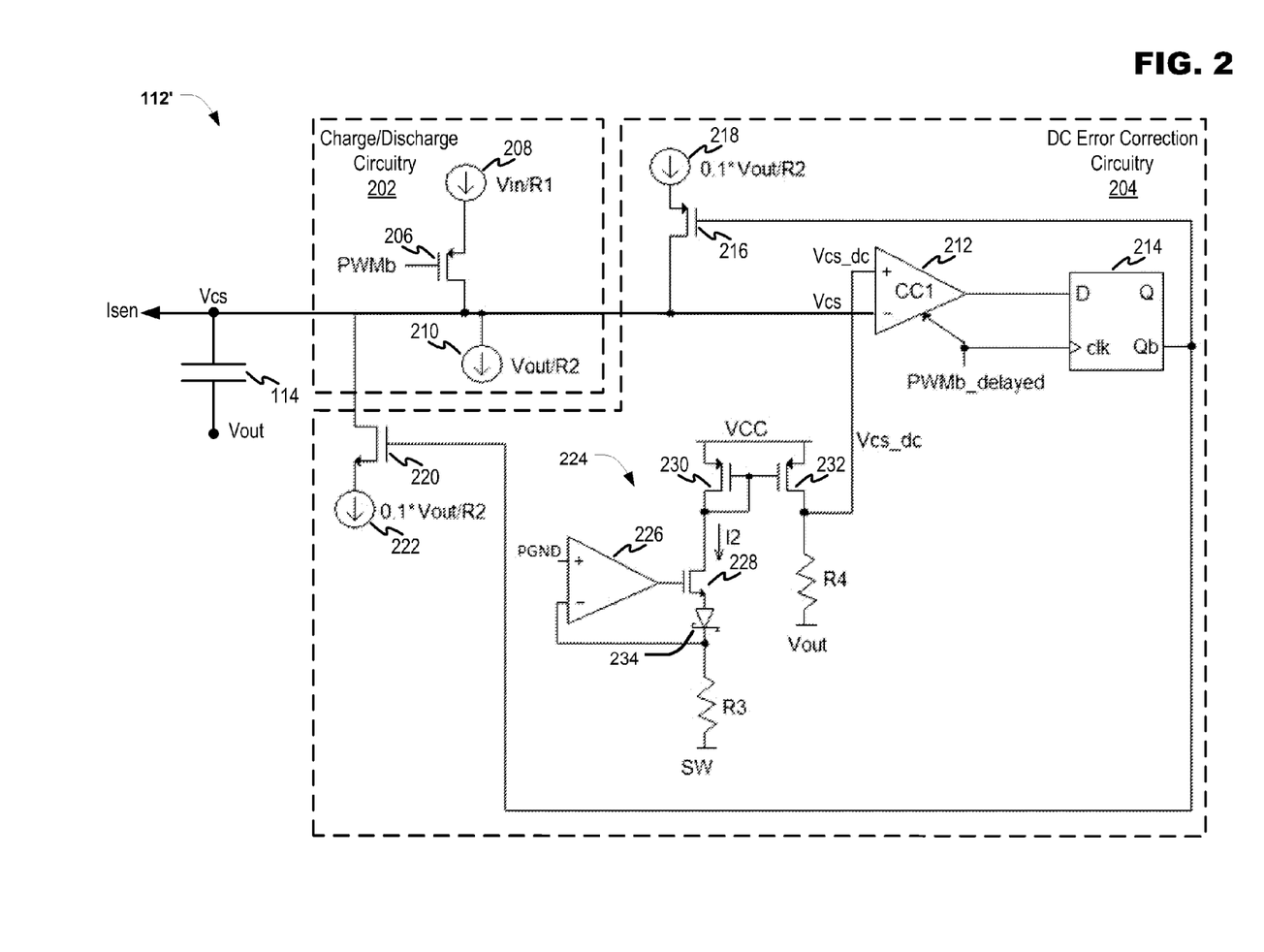
FIG. 2 illustrates simulation circuitry according to one embodiment of the present disclosure.

FIG. 2 illustrates simulation circuitry 112' according to one embodiment of the present disclosure. With continued reference to FIG. 1, the simulation circuitry 112' of this embodiment generally includes charge/discharge circuitry 202 and DC error correction circuitry 204. The charge/discharge circuitry 202 is generally configured to charge and discharge capacitor 114 based on the input voltage (Vin) applied to the switches of the power supply, and the output voltage, Vout, taken from the output of the inductor (109 in FIG. 1). The voltage across the capacitor 114, Vcs, is proportional to the inductor current, I1, through the inductor 109. The Vcs waveform (not shown), accordingly, is a triangular waveform, where the respective slopes of Vcs are proportional to (by a factor of (k)) the slopes of the current through the inductor (I1), as will be explained in greater detail below. The charge/discharge circuitry 202 includes switch 206, current source 208 and current sink 210. The switch 206 is a PMOS device (active low), and the conduction state of switch 206 is controlled by PWMb. Thus, switch 206 conducts when the PWMb signal is LOW, and opens when the PWMb signal is HIGH. Current source 208 is generally configured to generate a current proportional to Vin/R, where the value of R may be selected to maintain IC level currents, e.g., on the order of several microAmps. The current source 208 is configured to charge capacitor 114 when the switch 206 conducts. Current sink 210 is generally configured to generate a current proportional to Vout/R. The current source 210 is configured to discharge capacitor 114. Thus, when switch 206 is conducting, the voltage on the capacitor 114 is proportional to Vin–Vout, which, as noted above, is proportional to the positive slope of the inductor current. When switch 206 is non-conducting (OFF), the voltage on the capacitor 114 is proportional to –Vout, which, as noted above, is proportional to the negative slope of the inductor current.

However, since capacitor 114 is generally operating as an integrator, any estimation errors as a result of the current source 208 and/or current sink 210 may be compounded. As a result, the slopes of Vcs may not match the slopes of the true current through the inductor 109. Accordingly, this embodiment includes DC error correction circuitry 204 that is configured to generate a DC error correction signal, Vcs_dc, to correct for any errors that may be accumulating on the capacitor 114. The Vcs_dc signal is an instantaneous measurement of the current through the inductor 109. The DC error correction circuitry 204 includes comparator 212, switch 216, switch 220, current source 218 and current sink 222. The comparator 212 is configured to compare the Vcs voltage to Vcs_dc (the circuitry to generate Vcs_dc is described in greater detail below). The output of comparator 212 is used to control the conduction states of switches 216 and/or 220 to sink or source additional current from the capacitor 114. To reduce noise effects that may occur when the PWMb signal changes states, the comparator 212 may be configured to be enabled by a delayed PWMb signal (noted as PWMb_delayed in FIG. 2). Thus, the comparator 212 is not active until the delay period has ended. The amount of delay may be based on, for example, the amount of noise present in the signal, the switching frequency, duty cycle, etc. The delay also enables comparator 212 to "sample" at the same point along the Vcs slopes. This embodiment also includes flip-flop circuitry 214 configured to latch the output of comparator 212. The Qb output of flip-flop circuitry 214 is the compliment of the output of comparator 212, and is used to control the conduction state of switch 216 and switch 220.

The switch 216 is a PMOS device (active low), and the conduction state of switch 216 is controlled by the output of comparator 212. Thus, switch 216 conducts when the output of comparator 212 signal is HIGH (Qb is LOW), and opens when the output of comparator 212 signal is LOW (Qb is HIGH). Current source 218 is generally configured to generate a current proportional to the negative slope of the inductor current (e.g., 0.1*Vout/R, where the multiplier 0.1 is selected to approximate the error that may occur when estimating the slope of the inductor current. Of course, the 0.1 multiplier is provided only as an example, and in other implementations, the multiplier may be selected based on, for example, shifts in semiconductor processing, voltage and/or temperature shifts, etc. The current source 218 is configured to charge capacitor 114 when the switch 216 conducts. The switch 220 is an NMOS device (active high), and the conduction state of switch 220 is controlled by the output of comparator 212. Thus, switch 220 conducts when the output of comparator 212 signal is LOW (Qb is HIGH), and opens when the output of comparator 212 signal is HIGH (Qb is LOW). Current sink 222 is generally configured to generate a current proportional to the negative slope of the inductor current, e.g., 0.1*Vout/R, where the multiplier 0.1 may be selected as described above to approximate the error that may occur when estimating the slope of the inductor current. The current sink 222 is configured to discharge capacitor 114 when the switch 222 conducts.

In operation, if Vcs>Vcs_dc (indicating that the instantaneous value of Vcs is greater than the instantaneous inductor current and therefore the error of the slope approximation is positive), the output of comparator 212 is LOW and the Qb output of flip-flop circuitry 214 is HIGH. Switch 220 conducts causing current sink 222 to sink current from the capacitor 114, thus decreasing the slope of Vcs. If Vcs<Vcs_dc (indicating that the instantaneous value of Vcs is less than the instantaneous inductor current and therefore the error of the slope approximation is negative), the output of comparator 212 is HIGH and the Qb output of flip-flop circuitry 214 is LOW. Switch 216 conducts causing current source 218 to source current to the capacitor 114, thus increasing the slope of Vcs.

Simulation circuitry 112' may also include instantaneous inductor current sensing circuitry 224 configured to generate a signal (Vcs_dc) indicative of, or proportional to, the instantaneous current in the inductor 109. In general, circuitry 224 uses a Vds sensing technique that senses the voltage across the terminals of the low side power switch of the switching circuitry 108 (FIG. 1). Circuitry 224 includes amplifier circuitry 226, switch circuitry 228, current mirror circuitry 230 and 232, resistor R3 and resistor R4. Amplifier circuitry 226 is arranged in a negative feedback topology with PGND (where PGND is the power ground pin of the IC) coupled to the positive input terminal. The output of amplifier 226 is configured to control the conduction state of switch circuitry 228 so that the switch (in this example a MOS device) conducts so that the negative terminal of amplifier 226 is approximately equal to the positive terminal (i.e., PGND appears on both terminals). Switch 228 is coupled to diode 234 and to resistor R3. Resistor R3 is also coupled to the SW signal. SW is the signal at the drain of the low side switch of the switching circuitry 108 (FIG. 1). The signal SW, when the low side power switch is ON, can be derived from the following equation:

SW=I1*Rds(ON); where I1 is the instantaneous current through the inductor 109, and Rds(ON) is the drain/source ON resistance of the low side switch when the low side switch is ON (conducting).

If PGND is not approximately zero, the equation above can be generalized to:

SW−PGND=I1*Rds(ON)

Current I2 can be expressed by:

I2=(SW−PGND)/R3.

If resistor R3 is selected to be large enough, e.g., where the value of R3 may be selected to maintain IC level currents, e.g., on the order of several microAmps., then the equation above can be rewritten as:

I2=I1*Rds(ON))/R3.

Therefore, I2 is proportional to I1.

Current mirror circuitry 230, 232 is configured to multiply I1 (e.g., I2) by R4 to generate the instantaneous inductor current voltage signal Vcs_dc. The resistance value of R4 may be selected so that the proportionality to I1 of Vcs_dc is equal to the proportionality of I1 to Vcs. Vcs_dc can be therefore expressed as:

Vcs_dc=(Rds(ON)*I1*R4)/R3+Vout.

Therefore, (Vcs_dc−Vout) is a voltage that is directly proportional to I1, and thus, (Vcs_dc−Vout) is a direct measurement of the current in the inductor, I1.

Referring again to FIG. 1 and with continued reference to FIG. 2, the derivation of certain circuit values is set forth below. The relationship between the voltage in capacitor 114 and the current in the inductor 109 (I1) may be termed as follows:

Ics=C114*dVcs/dt; where Ics is the current into the capacitor 114, as described above.

Circuitry 112 is configured to relate the voltage in the capacitor 114 to the current in the inductor 109, therefore the circuitry 112 of the present disclosure provides the following relationship:

dVcs/dt=dI1/dt*Rdcr; where Rdcr is a value selected to give reasonable ripple on Vcs for use with an external controller IC.

Taking into account the scenario when the PWM input signal is high, the value of Ics may be simplified as set forth above (e.g., when PWM signal is high the current through the capacitor~(Vin−Vout)/) to yield the relationship:

Ics=(Vin−Vout)/R and dI1/dt=(Vin−Vout)/L; Combining the above equations and solving for C114 may then result in the following relationship:

(Vin−Vout)/(R)=C114*(Vin−Vout)/L*Rdcr; where C114 is the capacitance value of the capacitor 114, and C114=L/(R*Rdcr)

As discussed above, the charge and discharge currents are susceptible to error, and thus, may be corrected via a DC offset current. DC offset correction circuitry 204 may, in one embodiment, be a DC loop circuit that determines the value of the voltage across the low side FET (e.g., in switch network 108) during the low period of the PWM input signal. There are a variety of circuit configurations that may provide this function. For the sake of explanation in the present disclosure, at least one embodiment may use a voltage determined between a main switch drain (SW) and a power ground (PGND) available to the circuit. The voltage (Vsw−Vpgnd) may be placed across a resistor R3, mirroring the resulting current and then forcing the current across a second resistor R4. The voltage across R4 is equal to (Vcs_dc−Vout). Based on DC offset correction circuit 204, the DC offset voltage (Vcs_dc) may be derived as follows:

I2~(Vsw−Vpgnd)/R3=Vds_1s/R3=(IL*Rds(ON))/R3;

where Vsw is the voltage of the SW node and Vds_1s is the voltage across the drain to source of the low side power switch.

Thus, Vcs_dc~(IL*Rds(ON)*R4)/R3+Vout

Also, in this configuration, Vcs=IL*Rdcr+Vout, so (Rds(ON)*R4)/R3=Rdcr; and

R4/R3=Rdcr/Rds(ON)

Thus, the circuitry 112' generates a voltage on the capacitor 114 having the same, or substantially the same, slope as the inductor current I1, as well as the same, or substantially the same, voltage offset as that of the inductor current multiplied by an R factor. The voltage on the capacitor 114 is therefore equivalent to the inductor current, and may be used as the current (or voltage) feedback signal Isen as shown in FIGS. 1 and 2. The feedback signal Isen may be used by the controller circuitry 102 to adjust the duty cycle of the PWM signal to adjust the power delivered to the load 110.

Figure 3:
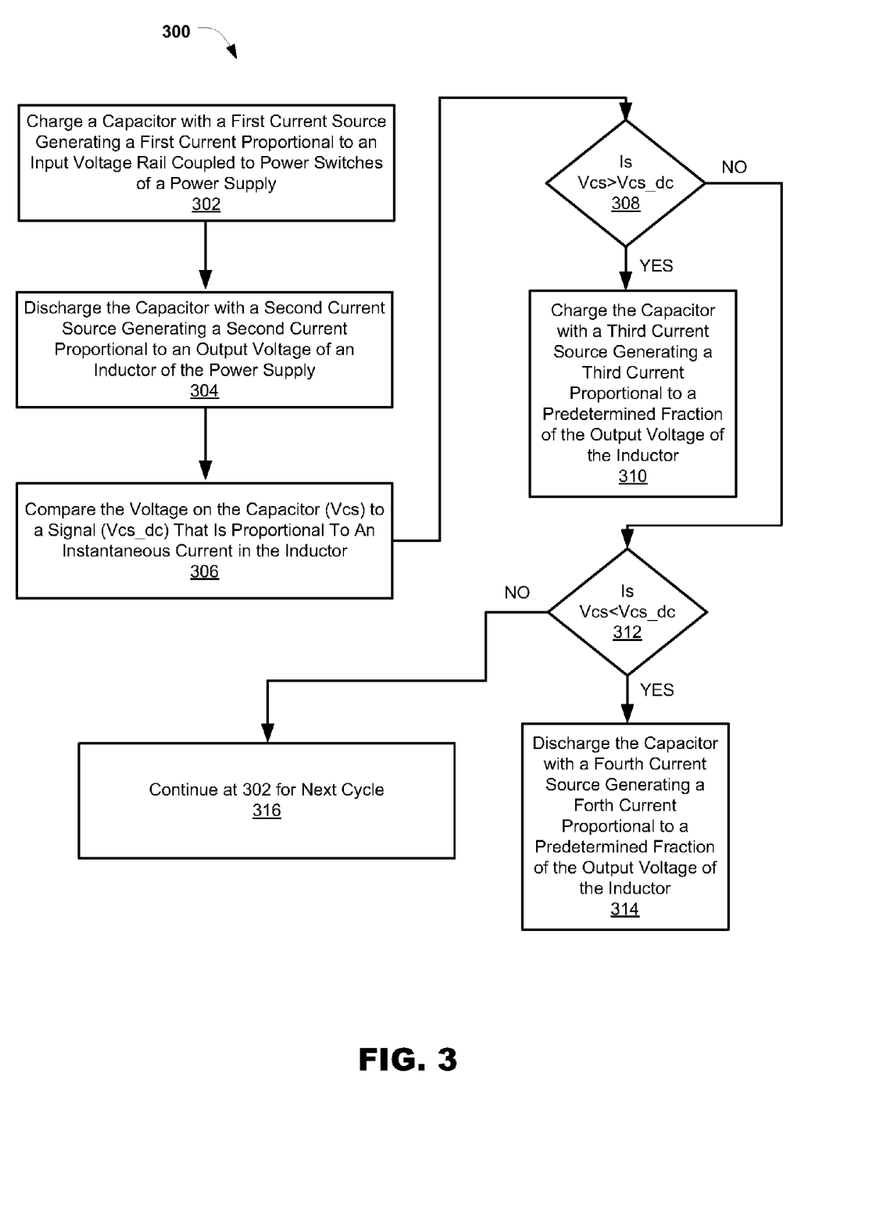
FIG. 3 illustrates a flowchart of example operations in accordance with at least one embodiment of the present disclosure.

FIG. 3 illustrates a flowchart 300 of example operations in accordance with at least one embodiment of the present disclosure. In particular, the flowchart 300 depicts operations of inductor current simulation circuitry 112 to simulate the inductor current using voltage across a capacitor. Operations of this embodiment include charging a capacitor with a first current source generating a first current proportional to an input voltage rail coupled to power switches of a power supply 302. Operations also include discharging the capacitor with a second current source generating a second current proportional to an output voltage of an inductor of the power supply 304. Operations may also include comparing the voltage on the capacitor (Vcs) to a signal proportional to an instantaneous current in the inductor (Vcs_dc) 306. Operations also include determining if Vcs is greater than Vcs_dc 308, and if so, charging the capacitor with a third current source generating a third current proportional to a predetermined fraction of the output voltage of the inductor 310. If Vcs is not greater than Vcs_dc, operations of this embodiment may further include determining if Vcs is less than Vcs_dc 312, and if so, discharging the capacitor with a fourth current source generating a fourth current proportional to a predetermined fraction of the output voltage of the inductor 314.

While the flowchart of FIG. 3 illustrates operations according to at least one embodiment, it is to be understood that not all of the operations depicted in FIG. 3 are necessary for other embodiments. In addition, it is fully contemplated herein that in other embodiments of the present disclosure, the operations depicted in FIG. 3 and/or other operations described herein may be combined in a manner not specifically shown in any of the drawings, and such embodiments may include less or more operations than are illustrated in FIG. 3. Thus, claims directed to features and/or operations that are not exactly shown in one drawing are deemed within the scope and content of the present disclosure.

"Circuit" or "circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or instructions sets (e.g., software, firmware, etc.). Accordingly, at least one embodiment of the present disclosure provides a power supply system that includes controller circuitry configured to generate a pulse width modulation (PWM) signal; driver circuitry configured to generate a complimentary PWM signal based on the PWM signal; power switch circuitry comprising a high side power switch and a low side power switch coupled to an input power voltage rail; and wherein the conduction state of the high side power switch is controlled by the PWM signal and the conduction state of the low side power switch is controlled by the complimentary PWM signal; and wherein the power switch circuitry is configured to generate a switched power output; an inductor configured to receive the switch power output and generate an output voltage to deliver power to a load coupled to the inductor. The system of this embodiment may also include inductor current simulation circuitry comprising a capacitor, charge/discharge circuitry, and error correction circuitry; wherein the charge/discharge circuitry is configured to charge the capacitor with a voltage that is proportional to the input voltage rail and discharge the capacitor with a voltage that is proportional to the output voltage; and wherein the error correction circuitry is configured to adjust the voltage that is proportional to the input voltage rail and the voltage that is proportional to the output voltage based on an instantaneous current of the inductor; and wherein the voltage on the capacitor is proportional to a current associated with the inductor.

In another embodiment, the present disclosure provides a circuit to approximate the inductor current of a power supply that includes a capacitor; charge/discharge circuitry configured to charge the capacitor with a voltage that is proportional to an input voltage rail of the power supply, and discharge the capacitor with a voltage that is proportional to the output voltage of the power supply; and error correction circuitry is configured to adjust the voltage that is proportional to the input voltage rail and the voltage that is proportional to the output voltage based on an instantaneous current of the inductor; and wherein the voltage on the capacitor is proportional to a current associated with the inductor.

In another embodiment, the present disclosure provides a method of simulating inductor current of a power supply that includes charging a capacitor with a first current source generating a first current proportional to an input voltage rail coupled to power switches of the power supply; discharging the capacitor with a second current source generating a second current proportional to an output voltage of the inductor of the power supply; comparing the voltage on the capacitor (Vcs) to a signal proportional to an instantaneous current in the inductor (Vcs_dc); determining if Vcs is greater than Vcs_dc and charging the capacitor with a third current source generating a third current proportional to a predetermined fraction of the output voltage of the inductor; and determining if Vcs is less than Vcs_dc and discharging the capacitor with a fourth current source generating a fourth current proportional to a predetermined fraction of the output voltage of the inductor.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A power supply system, comprising:
    controller circuitry configured to generate a pulse width modulation (PWM) signal;
    driver circuitry configured to generate a complimentary PWM signal based on the PWM signal;
    power switch circuitry comprising a high side power switch and a low side power switch coupled to an input power voltage rail; wherein the conduction state of the high side power switch is controlled by the PWM signal and the conduction state of the low side power switch is controlled by the complimentary PWM signal; and wherein the power switch circuitry is configured to generate a switched power output;
    an inductor configured to receive the switch power output and generate an output voltage to deliver power to a load coupled to the inductor; and
    inductor current simulation circuitry comprising a capacitor, charge/discharge circuitry, and error correction circuitry; wherein the charge/discharge circuitry is configured to charge the capacitor with a current that is proportional to the input voltage rail and discharge the capacitor with a current that is proportional to the output voltage; and wherein the error correction circuitry is configured to adjust the charge on the capacitor based on an instantaneous current of the inductor; and wherein the voltage on the capacitor is proportional to a current associated with the inductor.

2. The power supply system of claim 1, wherein the charge/discharge circuitry comprises a first current source configured to generate a first current proportional to the input power voltage rail, a first switch coupled between the first current source and the capacitor, wherein a conduction state of the first switch is controlled by the complimentary PWM signal so that the first current source charges the capacitor when the complimentary PWM signal is LOW; and a second current source configured to generate a second current proportional to the output voltage to discharge the capacitor.

3. The power supply of claim 1, wherein the error correction circuitry comprises:
    a first current source configured to generate a current that is proportional to a predetermined fraction of the output voltage and a first switch coupled between the first current source and the capacitor, said first current source is configured to increase the voltage on the capacitor;
    a second current source configured to generate a current that is proportional to a predetermined fraction of the output voltage and a second switch coupled between the second current source and the capacitor, said second current source is configured to decrease the voltage on the capacitor; and
    comparator circuitry configured to compare a signal proportional to the instantaneous current of the inductor and the voltage on the capacitor, and generate an output signal configured to control the conduction state of the first and second switches; wherein if the voltage on the capacitor is greater than the signal proportional to the instantaneous current of the inductor, the output signal of the comparator circuitry controls the second switch to couple the second current source to the capacitor and decrease the voltage on the capacitor; and wherein if the voltage on the capacitor is less than the signal proportional to the instantaneous current of the inductor, the output signal of the comparator circuitry controls the first switch to couple the first current source to the capacitor and increase the voltage on the capacitor.

4. The power supply of claim 3, wherein the error correction circuitry further comprises flip-flop circuitry configured to latch the output signal of the amplifier circuitry; and wherein an output of the flip-flop circuitry is configured to control the conduction state of the first and second switches.

5. The power supply system of claim 3, wherein the comparator circuitry is further configured to be activated with a delayed signal, wherein the delayed signal is a signal proportional to the complimentary PWM signal that includes a predetermined delay in reference to the complimentary PWM signal.

6. The power supply of claim 3, wherein the predetermined fraction is based on an error between a slope of a current in the inductor and a slope of a voltage on the capacitor.

7. The power supply system of claim 1, further comprising instantaneous inductor current sensing circuitry configured to generate a voltage signal that is proportional to the instantaneous current of the inductor, said instantaneous inductor current sensing circuitry comprises amplifier circuitry, switch circuitry, current mirror circuitry, a first resistor and a second resistor, wherein the amplifier circuitry is arranged in a negative feedback topology with a reference signal coupled to a positive input terminal, the output of the amplifier circuitry is configured to control the conduction state of the switch circuitry so that the switch conducts so that a negative terminal of the amplifier circuitry is approximately equal to the positive terminal, the switch circuitry is coupled to the first resistor and the first resistor is coupled to a voltage signal from between the low side power switch and the high side power switch and the switch is coupled to a first side of the current mirror circuitry, and second resistor is coupled to a second side of the current mirror circuitry and to the output voltage; wherein the conduction state of the switch circuitry causes a current to flow based on the values of the first resistor, second resistor and the voltage signal from between the low side power switch and the high side power switch; and wherein the voltage signal that is proportional to the instantaneous current of the inductor is a voltage between the second resistor and the second side of the current mirror circuitry.

8. The power supply system of claim 1, wherein the controller circuitry is further configured to adjust a duty cycle of the PWM signal based on the voltage on the capacitor.

9. A circuit to simulate the inductor current of a power supply, comprising
a capacitor;
charge/discharge circuitry configured to charge the capacitor with a current that is proportional to an input voltage rail of the power supply, and discharge the capacitor with a current that is proportional to the output voltage of the power supply; and
error correction circuitry is configured to adjust the voltage that is proportional to the input voltage rail and the voltage that is proportional to the output voltage based on an instantaneous current of the inductor; and wherein the voltage on the capacitor is proportional to a current associated with the inductor.

10. The power supply system of claim 9, wherein the charge/discharge circuitry comprises a first current source configured to generate a first current proportional to the input power voltage rail, a first switch coupled between the first current source and the capacitor, wherein a conduction state of the first switch is controlled by a pulse width modulation (PWM) signal to charge the capacitor based on the state of the PWM signal; and a second current source configured to generate a second current proportional to the output voltage to discharge the capacitor.

11. The power supply of claim 9, wherein the error correction circuitry comprises:
a first current source configured to generate a current that is proportional to a predetermined fraction of the output voltage and a first switch coupled between the first current source and the capacitor, said first current source is configured to increase the voltage on the capacitor;
a second current source configured to generate a current that is proportional to a predetermined fraction of the output voltage and a second switch coupled between the second current source and the capacitor, said second current source is configured to decrease the voltage on the capacitor; and
comparator circuitry configured to compare a signal proportional to the instantaneous current of the inductor and the voltage on the capacitor, and generate an output signal configured to control the conduction state of the first and second switches; wherein if the voltage on the capacitor is greater than the signal proportional to the instantaneous current of the inductor, the output signal of the comparator circuitry controls the second switch to couple the second current source to the capacitor and decrease the voltage on the capacitor; and wherein if the voltage on the capacitor is less than the signal proportional to the instantaneous current of the inductor, the output signal of the comparator circuitry controls the first switch to couple the first current source to the capacitor and increase the voltage on the capacitor.

12. The power supply of claim 11, wherein the error correction circuitry further comprises flip-flop circuitry configured to latch the output signal of the amplifier circuitry; and wherein an output of the flip-flop circuitry is configured to control the conduction state of the first and second switches.

13. The power supply system of claim 11, wherein the comparator circuitry is further configured to be activated with a delayed signal, wherein the delayed signal is a signal proportional to a pulse with modulation (PWM) signal that includes a predetermined delay in reference to the PWM signal.

14. The power supply of claim 11, wherein the predetermined fraction is based on an error between a slope of a current in the inductor and a slope of a voltage on the capacitor.

15. The power supply system of claim 9, further comprising instantaneous inductor current sensing circuitry configured to generate a voltage signal that is proportional to the instantaneous current of the inductor, said instantaneous inductor current sensing circuitry comprises amplifier circuitry, switch circuitry, current mirror circuitry, a first resistor and a second resistor, wherein the amplifier circuitry is arranged in a negative feedback topology with a reference signal coupled to a positive input terminal, the output of the amplifier circuitry is configured to control the conduction state of the switch circuitry so that the switch conducts so that a negative terminal of the amplifier circuitry is approximately equal to the positive terminal, the switch circuitry is coupled to the first resistor and the first resistor is coupled to a voltage signal from between the low side power switch and the high side power switch and the switch is coupled to a first side of the current mirror circuitry, and second resistor is coupled to a second side of the current mirror circuitry and to the output voltage; wherein the conduction state of the switch circuitry causes a current to flow based on the values of the first resistor, second resistor and the voltage signal from between the low side power switch and the high side power switch; and wherein the voltage signal that is proportional to the instantaneous current of the inductor is a voltage between the second resistor and the second side of the current mirror circuitry.

16. The power supply system of claim 9, wherein the controller circuitry is further configured to adjust a duty cycle of the PWM signal based on the voltage on the capacitor.

17. A method of simulating inductor current of a power supply, comprising:

charging a capacitor with a first current source generating a first current proportional to an input voltage rail coupled to power switches of the power supply;

discharging the capacitor with a second current source generating a second current proportional to an output voltage of the inductor of the power supply;

comparing the voltage on the capacitor (Vcs) to a signal proportional to an instantaneous current in the inductor (Vcs_dc);

determining if Vcs is greater than Vcs_dc and charging the capacitor with a third current source generating a third current proportional to a predetermined fraction of the output voltage of the inductor; and determining if Vcs is less than Vcs_dc and discharging the capacitor with a fourth current source generating a fourth current proportional to a predetermined fraction of the output voltage of the inductor.

18. The method of claim 17, further comprising:
generating a pulse width modulation (PWM) signal; and
controlling the first current source based on the PWM signal.

19. The method of claim 17, further comprising:
generating a pulse width modulation (PWM) signal; and
delaying the comparing of the voltage on the capacitor (Vcs) to the signal proportional to the instantaneous current in the inductor (Vcs_dc) by a predetermined delay time relative to the PWM signal.

20. The method of claim 17, wherein the power supply comprises a high side power switch and a low side power switch coupled in series with the input voltage rail, and the method further comprising generating Vcs_dc based on, at least in part, a current from between the high side power switch and the low side power switch.

21. The method of claim 17, further comprising:
generating a pulse width modulation (PWM) signal having a duty cycle; and
adjusting the duty cycle of the PWM based on the voltage on the capacitor.

22. The method of claim 17, wherein the power supply comprises a high side power switch and a low side power switch coupled in series with the input voltage rail, and the method further comprising;
generating a pulse width modulation (PWM) signal and controlling the conduction state of the high side switch using the PWM signal;
generating a complimentary PWM signal and controlling the conduction state of the low side switch using the complimentary PWM signal;
driving the inductor using an output of the high side power switch and the low side power switch.

23. The method of claim 17, wherein at least one predetermined fraction is based on an error between a slope of a current in the inductor and a slope of a voltage on the capacitor.

* * * * *

UNITED STATES PATENT AND TRADEMARK OFFICE
CERTIFICATE OF CORRECTION

PATENT NO. : 8,760,134 B2  Page 1 of 1
APPLICATION NO. : 13/564170
DATED : June 24, 2014
INVENTOR(S) : James Garrett It is certified that error appears in the above-identified patent and that said Letters Patent is hereby corrected as shown below:

On the title page, column 2 (Attorney, Agent or Firm), line 1, delete "Tucker;" and insert
-- Tucker --, therefor.

In the Claims

Column 12, line 14, in claim 22, delete "comprising;" and insert -- comprising: --, therefor.

Signed and Sealed this
Ninth Day of December, 2014

Michelle K. Lee
*Deputy Director of the United States Patent and Trademark Office*